(12) United States Patent
Panchaksharaiah et al.

(10) Patent No.: US 11,303,957 B2
(45) Date of Patent: Apr. 12, 2022

(54) SYSTEMS AND METHODS FOR ADJUSTING BUFFER SIZE

(71) Applicant: Rovi Guides, Inc., San Jose, CA (US)

(72) Inventors: Vishwas Sharadanagar Panchaksharaiah, Karnataka (IN); Vikram Makam Gupta, Karnataka (IN)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 17/077,421

(22) Filed: Oct. 22, 2020

(65) Prior Publication Data

US 2021/0099755 A1 Apr. 1, 2021

Related U.S. Application Data

(63) Continuation of application No. 16/141,450, filed on Sep. 25, 2018, now Pat. No. 10,848,819.

(51) Int. Cl.
| | | |
|---|---|---|
| *H04N 21/44* | (2011.01) | |
| *H04N 21/432* | (2011.01) | |
| *H04N 21/439* | (2011.01) | |
| *H04N 21/45* | (2011.01) | |

(52) U.S. Cl.
CPC ..... *H04N 21/44004* (2013.01); *H04N 21/432* (2013.01); *H04N 21/4392* (2013.01); *H04N 21/4532* (2013.01)

(58) Field of Classification Search
CPC ........... H04N 21/44004; H04N 21/432; H04N 21/4392; H04N 21/4532; H04N 21/4435; H04N 21/23406; H04N 21/23655; H04N 21/44213; H04N 21/25891; H04N 21/84; H04N 21/2662; H04N 21/8456; H04N 21/6373; H04N 21/64769
See application file for complete search history.

(56) References Cited

U.S. PATENT DOCUMENTS

| | | | |
|---|---|---|---|
| 9,473,548 B1 | 10/2016 | Chakrovorthy et al. | |
| 10,055,494 B1 | 8/2018 | Bordenet et al. | |
| 10,455,297 B1 | 10/2019 | Mahyar et al. | |
| 10,911,815 B1 | 2/2021 | McCarthy et al. | |
| 2010/0031193 A1 | 2/2010 | Stark et al. | |
| 2012/0222065 A1 | 8/2012 | Prins et al. | |
| 2012/0331106 A1* | 12/2012 | Ramamurthy | H04N 21/6175 709/218 |
| 2013/0173742 A1 | 7/2013 | Thomas et al. | |
| 2013/0297706 A1 | 11/2013 | Arme et al. | |
| 2014/0149555 A1* | 5/2014 | Bank | H04L 65/60 709/219 |
| 2014/0173070 A1 | 6/2014 | Morrison et al. | |
| 2015/0023404 A1 | 1/2015 | Li et al. | |

(Continued)

*Primary Examiner* — Kunal Langhnoja
(74) *Attorney, Agent, or Firm* — Haley Guiliano LLP

(57) ABSTRACT

Methods and systems are provided for adjusting a size of a buffer based on a probability that a rewind request will be received during a currently playing segment of media. When the system determines that receiving a rewind request is likely, the system will increase the size of a buffer such that the rewind request can be accommodated using data from the buffer. When the system determines that receiving a rewind request is unlikely, the system will decrease the size of the buffer to free resources for other system components.

16 Claims, 7 Drawing Sheets

(56) References Cited

U.S. PATENT DOCUMENTS

| | | |
|---|---|---|
| 2016/0014476 A1* | 1/2016 | Caliendo, Jr. ...... H04N 21/4396 |
| | | 725/32 |
| 2016/0173941 A1 | 6/2016 | Gilson et al. |
| 2017/0017652 A1 | 1/2017 | Neumeier et al. |
| 2017/0195734 A1 | 7/2017 | Park et al. |
| 2017/0257410 A1 | 9/2017 | Gattis et al. |
| 2017/0257654 A1 | 9/2017 | Branch et al. |
| 2017/0280208 A1 | 9/2017 | Mishra et al. |
| 2018/0035140 A1 | 2/2018 | Li et al. |
| 2018/0129273 A1 | 5/2018 | Thorwirth et al. |
| 2019/0238924 A1 | 8/2019 | Stumbo |
| 2019/0289359 A1 | 9/2019 | Sekar et al. |
| 2019/0349633 A1 | 11/2019 | Wannamaker |
| 2019/0373296 A1 | 12/2019 | Oakley |
| 2020/0037047 A1* | 1/2020 | Cheung ............. H04N 21/4758 |
| 2020/0037048 A1 | 1/2020 | Cheung et al. |
| 2020/0145701 A1 | 5/2020 | Liu et al. |
| 2020/0162530 A1 | 5/2020 | Furtwangler |
| 2020/0275163 A1 | 8/2020 | Danovitz |
| 2020/0293787 A1 | 9/2020 | Badr |

\* cited by examiner

SYSTEMS AND METHODS FOR ADJUSTING BUFFER SIZE

CROSS-REFERENCE TO RELATED APPLICATIONS

This application is a continuation of U.S. patent application Ser. No. 16/141,450, filed Sep. 25, 2018. The disclosure of which is hereby incorporated by reference herein in its entirety.

BACKGROUND

This disclosure is generally directed to media systems configured to receive and play media assets received from a remote device. In particular, methods and systems are provided for improved buffer size management in such media systems.

SUMMARY

Media systems commonly generate for display media assets received from a remote device. For example, a media player may play streaming audio or video received from a media server via an Internet connection. Such systems often utilize a local buffer where portions of a received media asset are stored before being displayed. However, such buffers commonly have a fixed size. Often, due to the buffer size being fixed, when a user rewinds the media assets too far, the needed portion of the media asset may no longer be contained in the buffer. In such cases, the media player has to make a new request for the remote device to provide the needed portion. Such requests are typically slow, inefficient and often result in interruption to media asset consumption caused by latency inherent in requests to remote devices. Additionally, in some systems it is not desirable to maintain a large buffer at all times. Large buffers consume limited random-access memory available to the media a system and may degrade overall performance of the media system due to unavailability of memory for other tasks.

Accordingly, to overcome these problems, system and methods are provided herein for adjusting the buffer size of a media player in a way designed to minimize additional requests to a remote system without the need to constantly maintain an unnecessarily large buffer. System and methods described herein leverage metadata of the media asset and data retrieved from a user profile to determine a likelihood (e.g., a probability) of a user requesting a rewind during a segment of the media asset that is being received from a remote device. As referred to herein, a "likelihood" relates to any measure of a future user rewind request occurring during the segment. For example, in some embodiments discussed below, a likelihood of the user requesting a rewind during an action scene may be a ratio between a number of times a user previously requested rewinds during action scenes and a number action scenes watched by the user, or the media system may determine the likelihood based on a genre of the segment matching a preferred genre of the user. As referred to herein, the term "likely" refers to a determination of whether the likelihood measure meets or exceeds an electronically stored predefined condition. For example, the media system may determine that a rewind request is likely when the ratio described above exceeds a predefined value, such as 0.5. In another example, the media system may determine that a rewind request is likely when the genre of the segment matches the preferred genre. When the the system determines that a rewind is likely, the size of the buffer is increased. When the segment concludes, the size of the buffer is reduced back to the original size. In this way, whenever a rewind request is received, the media system can retrieve the needed portion of the media asset available in the buffer, thus avoiding the need for an inefficient and slow request to a remote device. Additionally, the media system described herein do not need to maintain a large buffer at all times to achieve the aforementioned benefits.

The media system buffers a first segment of a media asset received from a remote device. For example, a video player executing in an Internet browser of a smartphone may buffer a first segment (e.g., a first scene of a movie) streamed from an on-line video service. The buffer may have a default size (e.g., buffer may have enough data to buffer 1 minute of the media asset).

The media system retrieves metadata associated with a second segment (e.g., a second scene of the movie). The metadata may contain information about the second segment such as the genre of the second segment, complexity of the second segment, language or accent of characters in the second segment, and audio level of the second segment. Additionally, the media system may receive historical data about rewind requests received by other systems when playing that segment for other users.

The media system may also retrieve a profile of the user who is currently watching the media asset. In some embodiments, the media system uses preferences in the profile, such as preferred genres and preferred languages, to determine whether the user will likely request a rewind during a segment. For example, the media system may determine that the user is likely to issue a rewind request when a scene is in a foreign language or spoken by a character with a strong accent. In some embodiments, the media system uses stored tolerances in the profile, such as the user's tolerance for complexity and the user's tolerance for low level of audio, to determine whether a rewind request is likely. For example, the media system may determine that the user is likely to issue a rewind request during a scene that is too complex for the user In yet further example, the media system may determine that the user is likely to issue a rewind request when the scene has an audio level is too low for the user. The media system may also retrieve historical data about rewind requests received from the same user while that user was consuming segments that are similar to the second segment.

Once the media system determines that a rewind request is likely during the second segment, the media system increases the size of the buffer. The second segment is then buffered in the buffer that has an increased size. In this way, the buffer size is increased during critical points when a rewind request is likely. When the user requests a rewind, the second segment is rewound, and the media system plays the second segment from the content of the buffer. In this way, a need to make a request to a remote device is avoided, resulting in smoother, faster rewind operation with less latency.

In one implementation, the increased size of the buffer may be large enough to accommodate buffering of the entire second segment. Alternatively, the increased size of the buffer may be set based on historical data. For example, the increased size may be set as to accommodate an average length of rewind requests received from other users during the consumption of that segment. Alternatively, the increased size may be set as to accommodate an average length of rewind requests received from the same user during consumption of other segments that are similar to the second segment.

Upon conclusion of the second segment, the media system reduces the size of the buffer. For example, the size of the buffer may be set back to the default size. In this way, a large buffer is not constantly maintained which frees up memory for other tasks, thus improving the operations of the media system as a whole. This improvement is particularly relevant in scenarios when a user is streaming the media asset using a mobile device that does not have a large amount of random access memory.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which reference characters refer to like parts throughout, and in which.

DETAILED DESCRIPTION

Methods and systems in accordance with the present disclosure are described herein that adjust a size of a buffer based on a likelihood that a user will request a rewind during playback of a media asset from a remote source, such as a video from a OTT provider. The size of the buffer is increased from an original size when it is likely that the user will request a rewind. For example, a rewind buffer may be increased from 50 megabytes ("MB") (e.g., approximately one minute of video) to 250 MB (e.g., approximately five minutes of video) in response to determining that it is likely that the user will rewind segment of a media asset. The size of the buffer is decreased to the original size once the segment is competed. For example, the system may reduce the size of the rewind buffer from 250 MB to 50 MB once the five minute segment is displayed.

Figure 1:
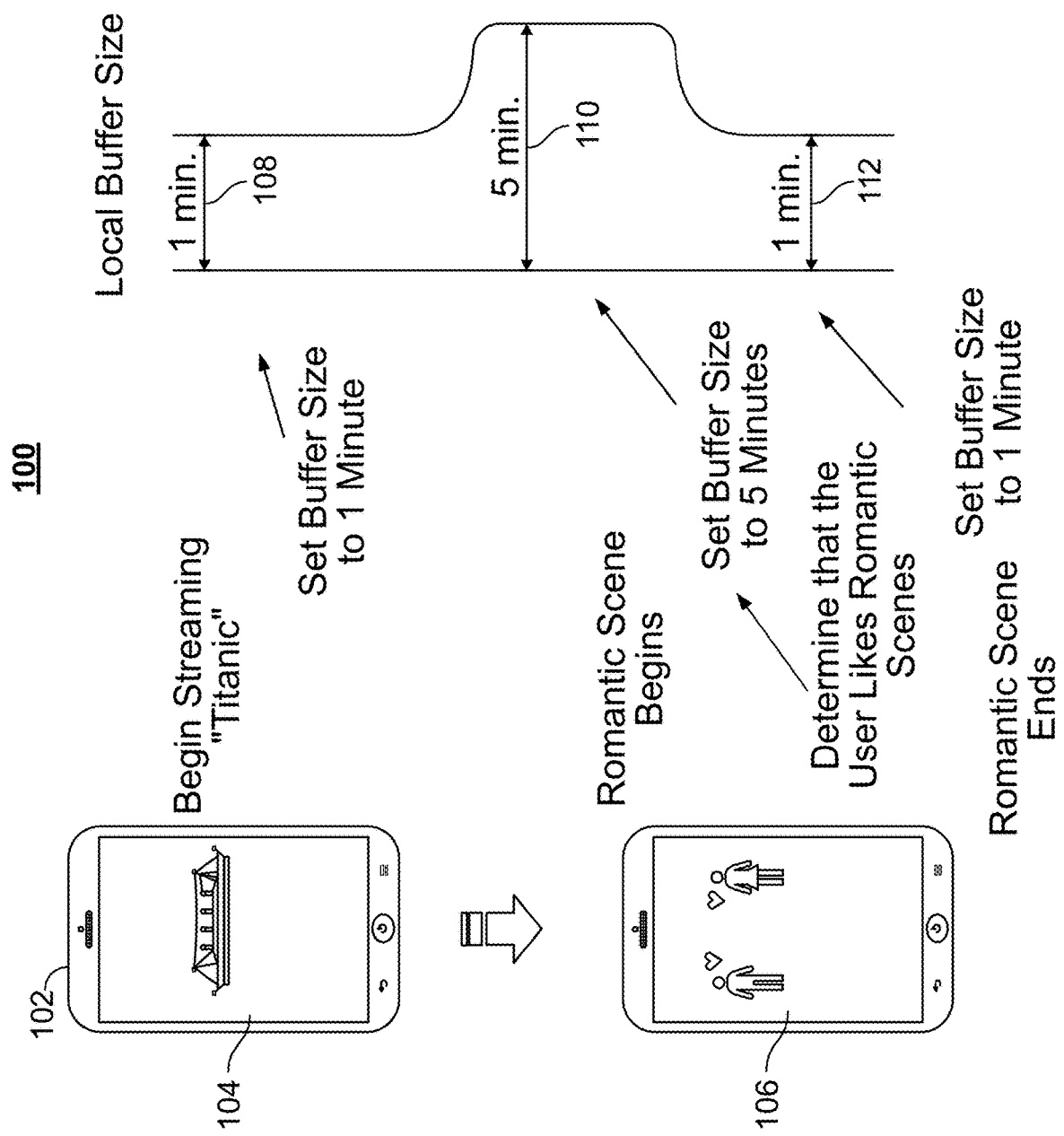
FIG. 1 shows an illustrative depiction of a user device that dynamically increases and decreases a size of a local buffer based on a likelihood of receiving a rewind request at the user device, in accordance with some embodiments of the disclosure.

FIG. 1 shows an illustrative depiction of user device 102 that increases a size of a local buffer based on determining that it is likely to receive a rewind request during a segment of a media asset, in accordance with some embodiments of the present disclosure. Although FIG. 1 depicts user device 102 as a tablet, it will be understood that the present disclosure that any suitable device for displaying and buffering a media asset may be used, such as user television equipment 302, user computer equipment 304, and/or wireless user communication device 306 discussed below in relation to FIG. 3. User device 102 may have control circuitry (e.g., control circuitry 204 discussed later in more detail with reference to FIG. 2) configured to determine whether a user is likely to rewind a segment of a media asset and adjust the size of a local buffer (e.g., a portion of storage 208, discussed later in relation to FIG. 2) used for storing the segment of the media asset. A media asset can be any electronically consumable content, such as streaming video or audio, Webcasts, on-demand programs (as in video-on-demand (VOD) media though a traditional television provider network or an OTT system), television programming, pay-per-view programs, or any combination of the same.

User device 102 is depicted displaying first segment 104 of a media asset (e.g., a first scene of "Titanic"). Control circuitry 204 may receive the media asset from one or more of a variety of content sources such as over-the-air signals, cable network signals, and wired or wireless streaming sources discussed further in relation to content source 316 of FIG. 3. In some embodiments, control circuitry 204 identifies a default size for the buffer based on attributes of the media asset and a predefined default rewind buffer duration. For example, control circuitry 204 determines that an default rewind buffer duration is one minute (depicted as first buffer size 108) and bitrate for the stream of "Titanic" is approximately seven megabits per second ("Mbps"). Control circuitry 204 estimates a size required to store one minute of "The Titanic" given the bitrate of the stream (e.g., seven Mbps) and may determine that a 50 MB buffer size is sufficient to store approximately one minute of the "Titanic" stream. Control circuitry 204 may allocate 50 MB of storage 208 (e.g., the portion of storage 208 depicted as default buffer 216 in FIG. 2) for a rewind buffer and may store segments of the media asset in the allocated buffer space (e.g., default buffer 216).

Figure 7:
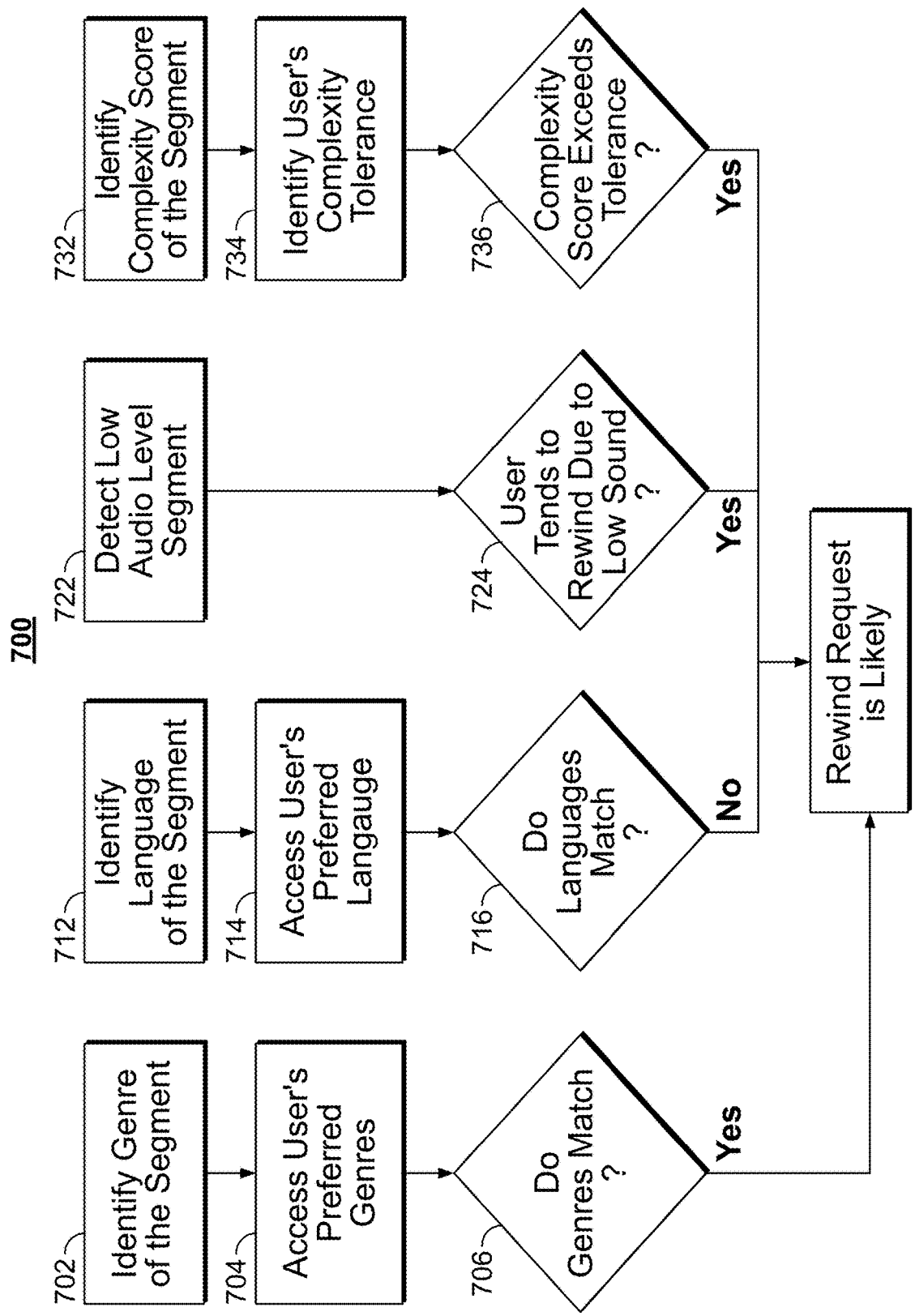
FIG. 7 is a flowchart of an illustrative process for determining whether a rewind request is likely, in accordance with some embodiments of the disclosure.

As control circuitry 204 receives additional segments of the media asset, control circuitry 204 determines whether a rewind request is likely to be received during each of the additional segments (discussed further in relation to FIG. 7). In some embodiments, control circuitry 204 retrieves metadata associated with a segment of a media asset and compares the metadata associated with the segment to a profile of a user to determine whether receiving a rewind request is likely while displaying the segment. For example, when the metadata indicates that the segment contains content that is of interest to the user, a rewind request may be more likely because a user may wish to re-watch interesting content as opposed to content in which the user is not interested. It should be understood that metadata may include any information relating to a media asset such as media-related information (e.g., titles, descriptions, ratings information (e.g., parental control ratings, critic's ratings, etc.), genre or category information, actor information, etc.), media format/stream settings (e.g., resolution, frame rate, bitrate etc.), or other type of data that indicates content or attributes of at least a portion of a media asset.

In some embodiments, control circuitry 204 receives metadata (e.g., via guidance data source 318 discussed in relation to FIG. 3) associated with a segment of the media asset being played by control circuitry 204 on a display (e.g., display 212) of user device 102. As depicted in FIG. 1, control circuitry 204 receives metadata indicating that a segment of the media asset (e.g., second segment 106) contains romantic content. Control circuitry 204 compares the attribute of segment 106 (e.g., romantic content) with a preference of the user to determine whether control circuitry 204 is likely to receive a request to rewind content. For example, control circuitry 204 may retrieve a profile of the user from storage 208 and may compare preferences stored in the profile of the user (e.g., a list content genres that are most frequently consumed by the user) with the attribute of the content (e.g., romantic content). Control circuitry 204 may determine that a rewind request will likely be received when the retrieved profile of the user indicates that the user is interested in romantic content (e.g., because a user may likely request to rewind a segment having content that is of interest to the user).

The devices and systems described herein allow a user to provide user profile information (e.g., by providing likes or interests via a GUI on user device 102) or automatically compile user profile information based on the behavior of the user. In some embodiments, control circuitry 204 monitors the media assets the user accesses and/or other interactions the user has with the system, such as when and for how long the user rewinds content. Control circuitry 204 may utilize the monitored behavior of the user to compute an average amount of time that the user rewinds though content as well as what type of content the user typically requests to rewind (discussed further in relation to FIG. 6). Control circuitry 204 may utilize the monitored behavior to estimate a size of a rewind buffer that can accommodate a typical rewind request from the user (discussed further in relation to FIG. 6). Additionally, control circuitry 204 may obtain all or part of other user profiles and may aggregate information from the other user profiles to determine an average rewind time for a plurality of users; control circuitry 204 may determine a buffer size based on the average rewind time for the plurality of users (discussed further in relation to FIG. 6). Control circuitry 204 may also utilize the profile information to determine whether a rewind request is likely (discussed further in relation to FIG. 7).

When control circuitry 204 determines determining that a rewind request is likely, control circuitry 204 increases a size of the buffer. As depicted in FIG. 1 control circuitry 204 increases the size of the local buffer from first buffer size 108, corresponding to one minute of content, to second buffer size 110, corresponding to five minutes of content. Control circuitry 204 may determine the size by which to increase the buffer based on a plurality of factors, such as a size of the segment, a typical rewind behavior of users who have watched the segment, or a typical rewind behavior of the user watching the segment (discussed further in relation to FIG. 6). In some embodiments, control circuitry 204 calculates the size of the buffer (e.g., second buffer size 110) based on a size of the segment that is likely to result in a rewind request (e.g., second segment 106). For example, control circuitry 204 may determine that second segment 106 is a five minutes long and may allocate enough storage in the buffer to store the entirety of the second segment. Accordingly, control circuitry 204 may request an additional allocation of space from storage 208 (e.g., an increase in space from default buffer 216 to expanded buffer 218) corresponding to an additional four minutes of storage space. In response to increasing the size of the buffer to second buffer size 110, control circuitry 204 stores second segment 106 in the buffer. For example, in response to increasing the size of the buffer in storage 208 from default buffer 216 to expanded buffer 218, control circuitry 204 stores all five minutes of second segment 106 of "Titanic" in expanded buffer 218. In some embodiments, the size of the buffer is stored in metadata retrieved by control circuitry 204. For example, the computation of the size of the buffer may be performed on a server and may be transmitted to control circuitry 204 with metadata transmitted along with the media asset or separately from the media asset.

In some embodiments, control circuitry 204 receives a request to rewind second segment 106 and retrieves portions of the segment from the buffer (e.g., expanded buffer 218). For example, control circuitry 204 may retrieve a request to rewind the media asset two minutes from a current playback position in the media asset. Because control circuitry 204 increased the buffer size from first buffer size 108, capable of storing one minute of content, to second buffer size 110, capable of storing five minutes of content, control circuitry 204 retrieves two minutes of the second segment from the buffer. In contrast, if control circuitry 204 had not increased the size of the buffer, control circuitry 204 would request an additional minute of content from a content source in response to receiving the request to rewind two minutes of content, thus increasing the latency of the rewind functionality.

When control circuitry 204 detects that the second segment has ended, control circuitry 204 reduces the size of the buffer. For example, control circuitry 204 may determine that the romantic scene in "Titanic" is over based on metadata associated with the second segment 106, such as metadata indicating an end time for second segment 106. In response to detecting the end of the second segment, control circuitry 204 reduces the size of the buffer back to the default size (e.g., one minute of content as discussed above), such as first buffer size 108 or third buffer size 112 in FIG. 1. In some embodiments, control circuitry 204 receives an additional segment of the media asset (e.g., a third segment of the media asset following the second segment) and stores the third segment of the media asset in the buffer that is resized to the default size (e.g., because the control circuitry 204 may determine that a rewind request is unlikely to be received during the third segment).

Figure 2:
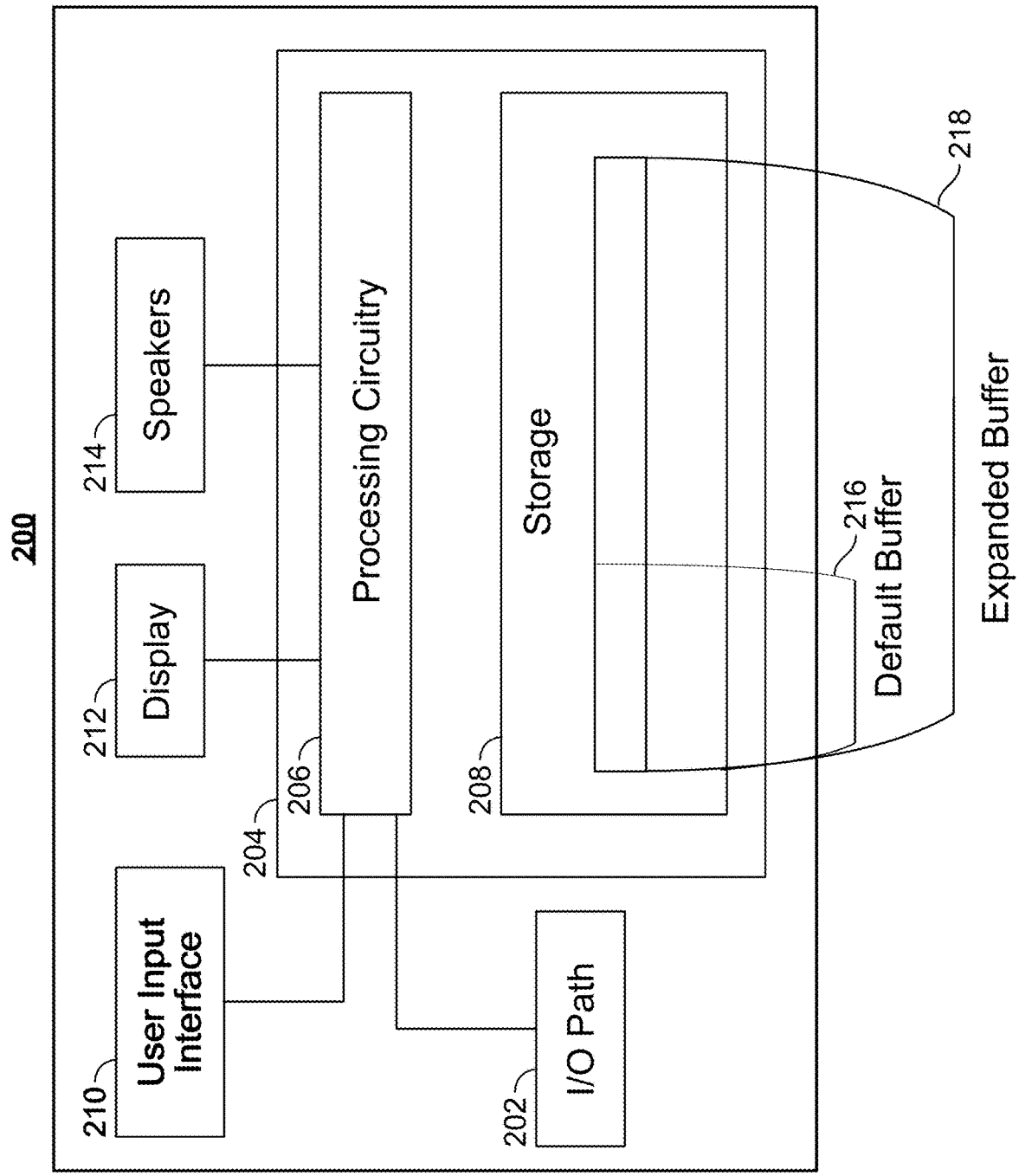
FIG. 2 is a block diagram of an illustrative media system, in accordance with some embodiments of the disclosure.

FIG. 2 depicts a generalized embodiment of an illustrative device (e.g., user device 102) that dynamically adjusts the size of a buffer based on a likelihood that a user will rewind a media asset playing on the illustrative device. User equipment 200 may be any of a plurality of user devices such as a smartphone, a tablet, personal computer, set-top box, etc. (Discussed further below with respect to FIG. 3). User equipment 200 may receive content and data via input/output (hereinafter "I/O") path 202. I/O path 202 may provide content (e.g., on-demand programming, Internet content, content available over a local area network (LAN) or wide area network (WAN), and/or other content) and data to control circuitry 204, which includes processing circuitry 206 and storage 208. Control circuitry 204 may be used to send and receive commands, requests, and other suitable data using I/O path 202. I/O path 202 may connect control circuitry 204 (and specifically processing circuitry 206) to one or more communications paths (described below in relation to FIG. 3). I/O functions may be provided by one or more of these communications paths but are shown as a single path in FIG. 2 to avoid overcomplicating the drawing.

Control circuitry 204 may be based on any suitable processing circuitry such as processing circuitry 206. Processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multicore processor (e.g., quad-core). In some embodiments, processing circuitry may be distributed across multiple separate processor or processing units, for example, multiple of the same type of processing units (e.g., two Intel Core i7 processors) or multiple different processors (e.g., Ryzen processor with integrated CPU and GPU processing cores). In some embodiments, control circuitry 204 executes instructions for an application stored in memory (e.g., memory 208). Specifically, control circuitry 204 may be instructed by a media application to perform the functions discussed above and below. For example, the media application may provide instructions to control circuitry 204 to adjust a size of a buffer based on a determination of whether the user is likely to rewind a portion of a media asset. In some implementations, any action performed by control circuitry 504 may be based on instructions received from the media application.

Control circuitry 204 may include tuning circuitry, such as one or more analog tuners, one or more MP3 decoders or other digital decoding circuitry, or any other suitable tuning or audio circuits or combinations of such circuits. Encoding circuitry (e.g., for converting analog or digital signals to signals for storage in storage 208) may also be provided. Control circuitry 204 may also include scaler circuitry for upconverting and downconverting content into the preferred output format of the user equipment 200, and converter circuitry for converting between digital and analog signals. The tuning and encoding circuitry may be used by user device 200 to receive, play, and buffer content. The circuitry described herein, including for example, the tuning, audio generating, encoding, decoding, encrypting, decrypting, scaler, and analog/digital circuitry, may be implemented using software running on one or more general purpose or specialized processors. If storage 208 is provided as a separate device from user equipment 200, the tuning and encoding circuitry may be associated with storage 208.

Storage 208 may may be any device for storing electronic data, such as random-access memory, solid state devices, quantum storage devices, hard disk drives, non-volatile memory or any other suitable fixed or removable storage devices, and/or any combination of the same. Control circuitry 204 may allocate portions of storage 208 for various purposes such as caching application instructions, recording media assets, storing portions of a media asset, buffering segments of media, etc. As described herein, storage 208 is used to store segments of a media asset in a portion of storage 208 referred to herein as a buffer. Control circuitry 204 dynamically adjusts an amount of storage 208 used for buffering the media asset based on a likelihood (e.g., probability) that the user will rewind the segment stored in the buffer. Control circuitry 204 allocates a default portion of storage 208 as a rewind buffer, such as the portion of storage 208 depicted as default buffer 216, upon receiving a segment of a media asset that is unlikely to be rewound. Control circuitry 204 allocates a larger portion of storage 208 as the rewind buffer, such as the portion of storage 208 depicted as expanded buffer 218, upon receiving a second segment of a media asset that is likely to be rewound. In some embodiments, when re-sizing the buffer control circuitry 204 may request a new block of storage 208 corresponding to the new buffer size (e.g., similar to a malloc function call in C). Alternatively, control circuitry 204 may expand and contract a block of memory reserved for the buffer that reuses at least a portion of the block previously used by the buffer (e.g., similar to a realloc function call in C). In some embodiments, control circuitry 204 ensures that contiguous blocks of memory are allocated to the buffer to enhance system performance, though this is not necessary.

A user may send instructions to control circuitry 204 using user input interface 210. User input interface 210 may be any suitable user input interface, such as a remote control, mouse, trackball, keypad, keyboard, touch screen, touchpad, stylus input, joystick, voice recognition interface, or other user input interfaces. In some embodiments, control circuitry 204 receives a user input to rewind a segment of a media asset via user input interface 210.

Display 212 may be provided as a stand-alone device or integrated with other elements of each one of user equipment device 200. For example, display 212 may be a touchscreen or touch-sensitive display. In such circumstances, user input interface 210 may be integrated with or combined with display 212. Display 212 may be one or more of a monitor, a television, a liquid-crystal display (LCD) for a mobile device, silicon display, e-ink display, light-emitting diode (LED) display, or any other suitable equipment for displaying visual images. Graphics processing circuitry may generate the output to the display 212. In some embodiments, the graphics processing circuitry may be external to processing circuitry 206 (e.g., as a graphics processing card that communicates with processing circuitry 206 via I/O path 202) or may be internal to processing circuitry 206 or control circuitry 204 (e.g., on a same silicone die as control circuitry 204 or processing circuitry 206). In some embodiments, the graphics processing circuitry and may be used to receive, display, play, and buffer content.

Speakers 214 may be provided as integrated with other elements of user equipment device 200 or may be stand-alone units. The audio component of videos and other content displayed on display 212 may be played through speakers 214. In some embodiments, the audio may be distributed to a receiver (not shown), which processes and outputs the audio via speakers 214.

The media application may be implemented using any suitable architecture. For example, it may be a stand-alone application wholly-implemented on user equipment 200. The user interface application and/or any instructions for performing any of the embodiments discussed herein may be encoded on computer readable media. Computer readable media includes any media capable of storing data. In some embodiments, the media application may be aware of other applications running on user equipment 200 an may delay increasing a size when there is insufficient space to increase the size of the buffer in storage 208. For example, the media application may determine an amount of free storage in storage 208 and may increase a size of a buffer to a lesser of an estimated amount of storage required to accommodate an expected rewind request from a user (discussed further in relation to FIG. 6) or an amount of storage available in storage 208.

Figure 3:
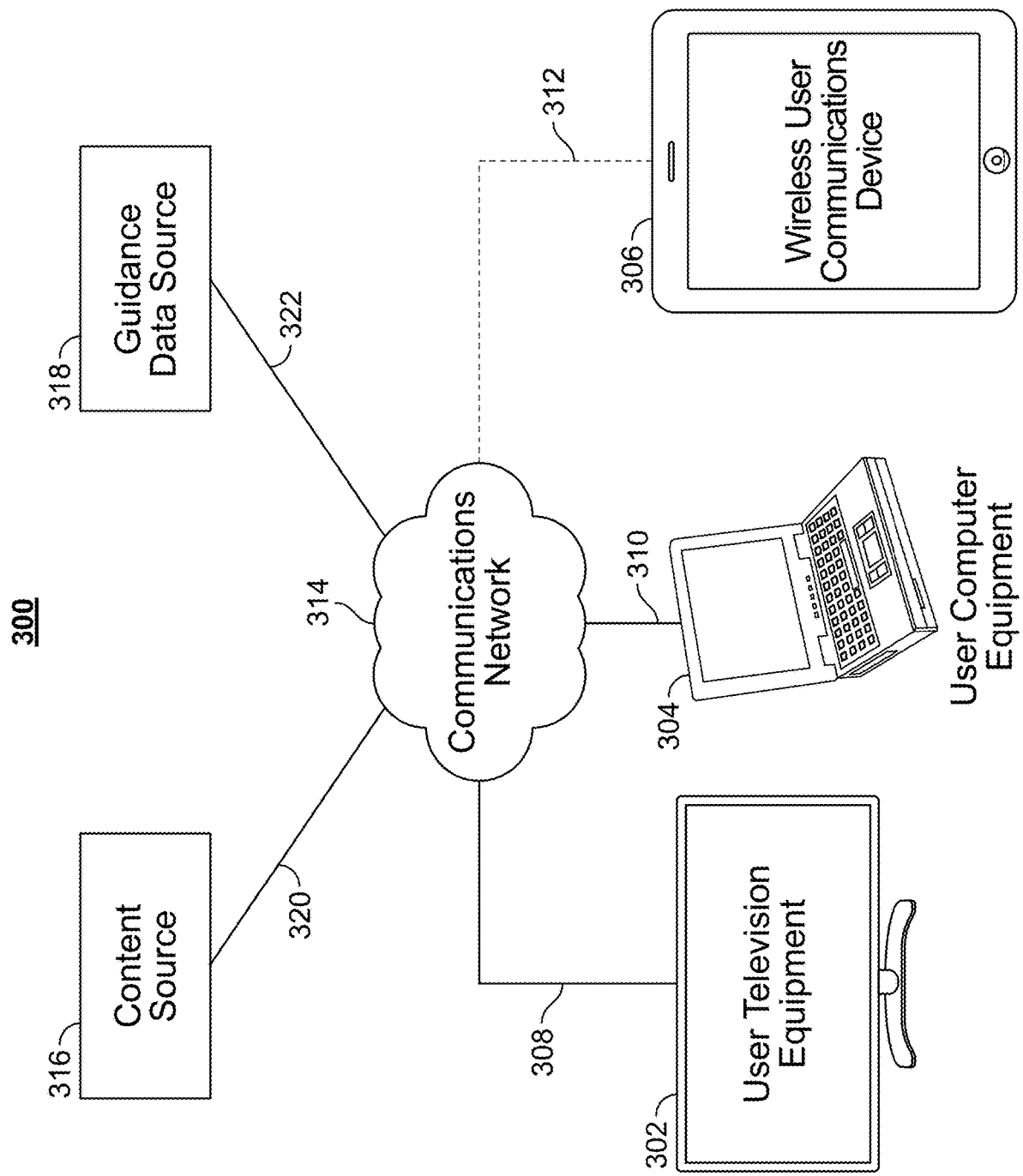
FIG. 3 is a block diagram of an illustrative user equipment device, in accordance with some embodiments of the present disclosure.

FIG. 3 depicts an exemplary media system in accordance with some embodiments of the disclosure user device 102 and user equipment 200 can be implemented in system 300 of FIG. 3 as user television equipment 302, user computer equipment 304, wireless user communications device 306, or any other type of user equipment suitable for accessing media. For simplicity, these devices may be referred to herein collectively as user equipment. User equipment, on which the media application is implemented, may function as a standalone device or may be part of a network of devices. Various network configurations of devices may be implemented and are discussed in more detail below.

User television equipment 302 may include a set-top box, an integrated receiver decoder (IRD) for handling satellite television, a television set, a digital storage device, or other user television equipment. One or more of these devices may be integrated to be a single device, if desired. User computer equipment 304 may include a PC, a laptop, a streaming content aggregator, a PC media center, or other user computer equipment. Wireless user communications device 306 may include a smartphone, a portable video player, a portable music player, a portable gaming machine, a tablet, a wireless streaming device or other wireless devices. It should be noted that the lines are blurred when trying to classify a device as one of the above devices and one device may be categorized into one or more of the categories listed above.

In system 300, there is typically more than one of each type of user equipment but only one of each is shown in FIG. 3 to avoid overcomplicating the drawing. In addition, each user may utilize more than one type of user equipment (e.g., a user may have a computer and a tablet) and also more than one of each type of user equipment device (e.g., a user may have multiple television sets).

The user equipment may be coupled to communications network 314. Namely, user television equipment 302, user computer equipment 304, and wireless user communications device 306 are coupled to communications network 314 via communications paths 308, 310, and 312, respectively. Communications network 314 may be one or more networks including the Internet, a mobile phone network, ad-hoc network, cable network, or other types of communications network or combinations of communications networks. Paths 308, 310, and 312 may separately or together include one or more communications paths, including any suitable wired or wireless communications path or combination of such paths. Path 312 is drawn with dotted lines to indicate that in the exemplary embodiment shown in FIG. 3 it is a wireless path and paths 308 and 310 are drawn as solid lines to indicate they are wired paths (although these paths may be wireless paths). Communications with the user equipment may be provided by one or more of these communications paths but are shown as a single path in FIG. 3 to avoid overcomplicating the drawing. The user equipment devices may communicate with each other directly through an indirect path via communications network 314 or through a direct path using device to device network (e.g., Bluetooth).

System 300 includes content source 316 and guidance data source 318 coupled to communications network 314 via communication paths 320 and 322, respectively. Paths 320 and 322 may include any of the communication paths described above in connection with paths 308, 310, and 312. Communications with the content source 316 and guidance data source 318 may be exchanged over one or more communications paths but are shown as a single path in FIG. 3 to avoid overcomplicating the drawing. In addition, there may be more than one of each of content source 316 and guidance data source 318, but only one of each is shown in FIG. 3 to avoid overcomplicating the drawing. In some embodiments, content source 316 and guidance data source 318 are integrated as one source device. Although communications between sources 316 and 318 with user equipment 302, 304, and 306 are shown as through communications network 314, in some embodiments, sources 316 and 318 may communicate directly with user equipment devices 302, 304, and 306 via communication paths (not shown) such as those described above in connection with paths 308, 310, and 312.

Content source 316 may include one or more types of media distribution equipment such as a media server, cable system headend, satellite distribution facility, intermediate distribution facilities and/or servers, Internet providers, on-demand media servers, and other media providers. Content source 316 may be the originator of media content or may not be the originator of media content. Content source 316 may also include a remote media server used to store different types of media content (including a media asset selected by a user and buffered on user equipment), in a location remote from any of the user equipment. Systems and methods for providing remotely stored media to user equipment are discussed in greater detail in connection with Ellis et al., U.S. patent application Ser. No. 09/332,244, filed Jun. 11, 1999, which is hereby incorporated by reference herein in its entirety.

Guidance data source 318 may provide media guidance data, such as the metadata discussed above in relation to FIG. 1 or any other data related to a media asset or profile of a user. Guidance data may be provided to the user equipment using any suitable approach such as via a data feed or by querying a database of guidance data source 318. For example, control circuitry 204 may transmit a query to a database of guidance data source 318 comprising a command to retrieve metadata and an identifier uniquely representing a media asset. In response to transmitting the query, control circuitry 204 may receive a response from the database comprising metadata for the media asset uniquely represented by the identifier.

System 300 is intended to illustrate a number of approaches, or network configurations, by which user equipment devices and sources of media content and guidance data may communicate with each other for the purpose of accessing media and data related to the media. The configuration of the devices and paths in system 300 may change without departing from the scope of the present disclosure.

Figure 4:
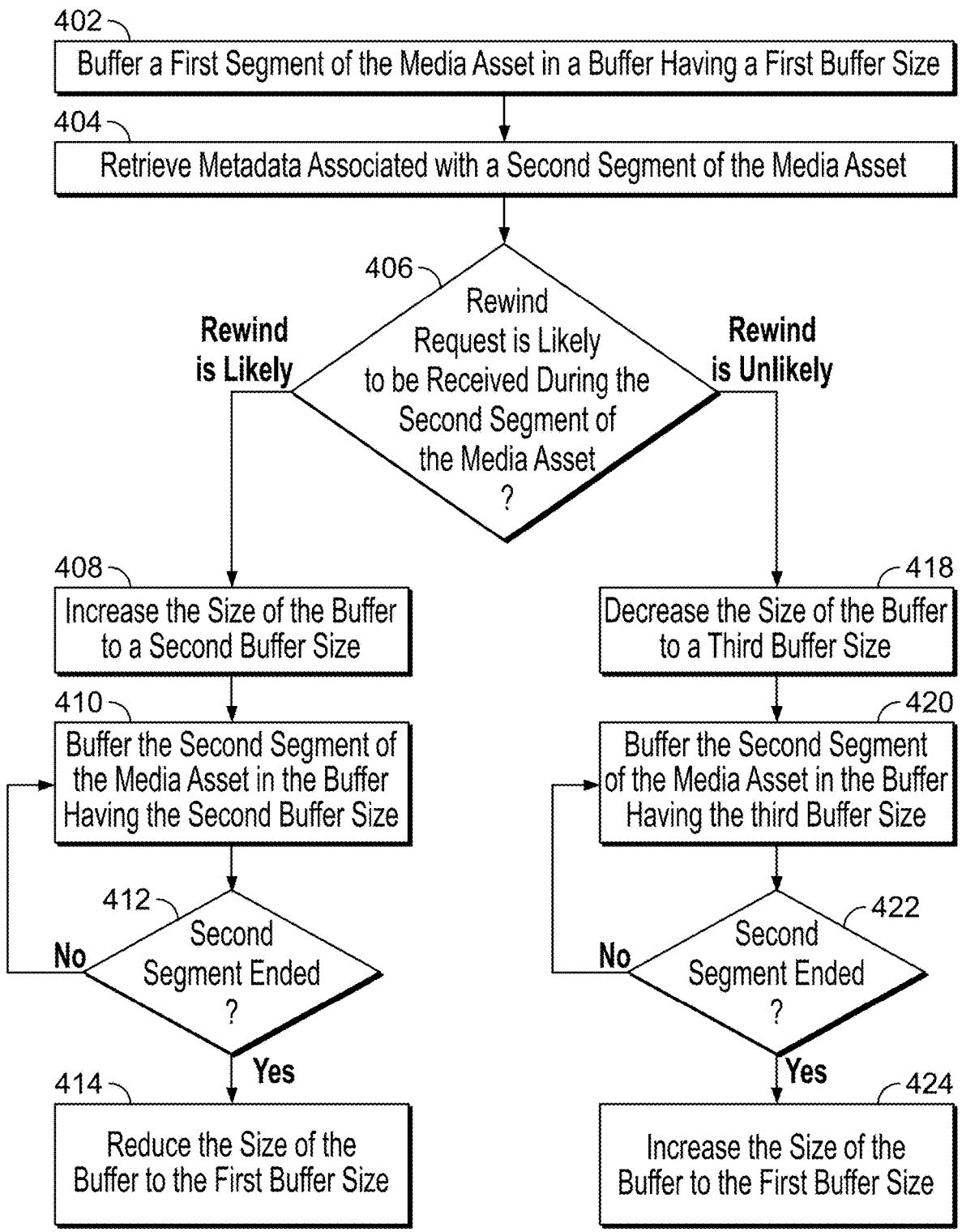
FIG. 4 is a flowchart of an illustrative process for increasing and decreasing the size of a buffer based on a likelihood of receiving a rewind request, in accordance with some embodiments of the disclosure.

FIG. 4 is a flowchart of an illustrative process for adjusting a size of a buffer based on a likelihood of receiving a rewind request in accordance with some embodiments of the present disclosure. Process 400 begins at 402, where control circuitry 204 buffers a first segment of the media asset (e.g., first segment 104) in a buffer having a first buffer size (e.g., first buffer size 108). For example, control circuitry 204 may receive a segment of a media asset (e.g., "Titanic") from content source 316 as described with respect to FIG. 3. Control circuitry 204 may store the segment in a local rewind buffer (e.g., storage 208) to allow for the user to rewind at least the segment of the media asset without having to query content source 316 for the segment. Control circuitry 204 allocates a default sized portion of storage 208 as the buffer (e.g., 50 MB, discussed further in relation to FIG. 6 and above in relation to default buffer 216 in FIG. 2).

At 404, control circuitry 204 retrieves metadata associated with a second segment of the media asset (e.g., second segment 106). In some embodiments, control circuitry 204 may receive metadata associated with the segment in a same packet as media data (e.g., a frame of audio or video data). For example, control circuitry 204 may receive a packet comprising video and audio data for a romantic scene of "Titanic." The packet may additionally comprise a header including the metadata specific to the frame, such as an identification of content in the frame, a sequence number for the audio/video data, characters that appear in the frame, an identifier of the media asset, etc. In some embodiments, control circuitry 204 may retrieve metadata of the media asset from guidance data source 318 using any of the methods discussed above in relation to FIG. 3. For example, control circuitry 204 may determine a unique identifier for the second segment (e.g., a scene number in the media asset)

and may query guidance data source 318 for metadata associated with the identified scene.

At 406 control circuitry 204 determines whether a rewind request is likely to be received during the second segment of the media asset (e.g., second segment 106). For example, as discussed above, control circuitry 204 may determine that receiving a rewind request during the segment is likely when a likelihood measure meets or exceeds a predefined, electronically stored condition (e.g., a stored binary condition, a stored threshold condition or a combination of multiple stored binary and/or multiple stored threshold conditions). An illustrative process for determining whether a rewind request is likely to be received during the second segment of the media asset is discussed further in detail with respect to FIG. 7. If control circuitry 204 determines that a rewind is likely (e.g., based on romantic content in the metadata matching a preference of romantic content for the user), process 400 proceeds to 408, where control circuitry 204 increases a size of the buffer. If control circuitry 204 determines that a rewind is unlikely (e.g., based on romantic content in the metadata not matching any content preference in a profile of the user), process 400 proceeds to 418, where control circuitry 204 decreases the size of the buffer.

At 408 control circuitry 204 increases the size of the buffer to a second buffer size (e.g., second buffer size 110), larger than the first buffer size (e.g., first buffer size 108) so that if a rewind request is received, control circuitry 204 can accommodate a greater portion of the rewind request using content from just the buffer. For example, control circuitry 204 increases the buffer size from first buffer size 108, which accommodates one minute of "Titanic," to second buffer size 110, which accommodates five minutes of "Titanic" so that the control circuitry 204 can accommodate up to five minutes of rewinding before control circuitry 204 would need to retrieve additional content from content source 316. In some embodiments, control circuitry 204 computes a size for the buffer based on a rewind duration that is expected to be received during the segment. An illustrative process for computing a size of expanded buffer 218 is discussed further in relation to FIG. 6.

At 410 control circuitry 204 buffers the second segment of the media asset in the buffer having the second buffer size (e.g., second buffer size 110). For example, control circuitry 204 may receive packetized portions of the second segment over a data connection (e.g., communications network 314) and may store the portions of the second segment (e.g., second segment 106) in expanded buffer 218. In some embodiments, control circuitry 204 replaces data in the buffer using a first in first out (FIFO) replacement algorithm. For example, data that is oldest in the buffer is replaced with newest data from the media asset stream (e.g., a video frame that was played 5 minutes and 1 second ago is replaced with a video frame that was played 1 second ago).

At 412 control circuitry 204 determines whether the second segment has ended and, if so, process 400 proceeds to 414 where control circuitry 204 reduces the size of the buffer to the first buffer size, such as default buffer 216 (e.g., because receiving a rewind request is no longer likely and therefore the rewind buffer can occupy less space in storage 208 than expanded buffer 218). If the second segment has not ended, control circuitry 204 continues to buffer the second segment of the media asset in expanded buffer 218 as described above.

At 418 control circuitry 204 decreases the size of a buffer to a third size in response to determining that a rewind is unlikely so that fewer storage resources are utilized by the buffer when a rewind request is unlikely. In some embodiments, the third buffer size is smaller than both default buffer 216 and expanded buffer 218. For example, the third buffer size may accommodate 30 seconds of "Titanic" whereas the default buffer accommodates 1 minute of "Titanic" and the expanded buffer accommodates 5 minutes of "Titanic."

At 420 control circuitry 204 buffers the second segment of the media asset in the buffer having the third buffer size. For example, control circuitry 204 may store 30 seconds of the segment in the buffer (e.g., a portion of storage 208 that is smaller than default buffer 216 and expanded buffer 218). At 422 control circuitry 204 monitors play progress of the second segment and proceeds to increase the buffer size at 424 once the second segment is complete. For example, when control circuitry 204 determines that the second segment is completed, control circuitry 204 may resize the buffer back to the default buffer size because a rewind may no longer be unlikely after the second segment is completed.

Figure 5:
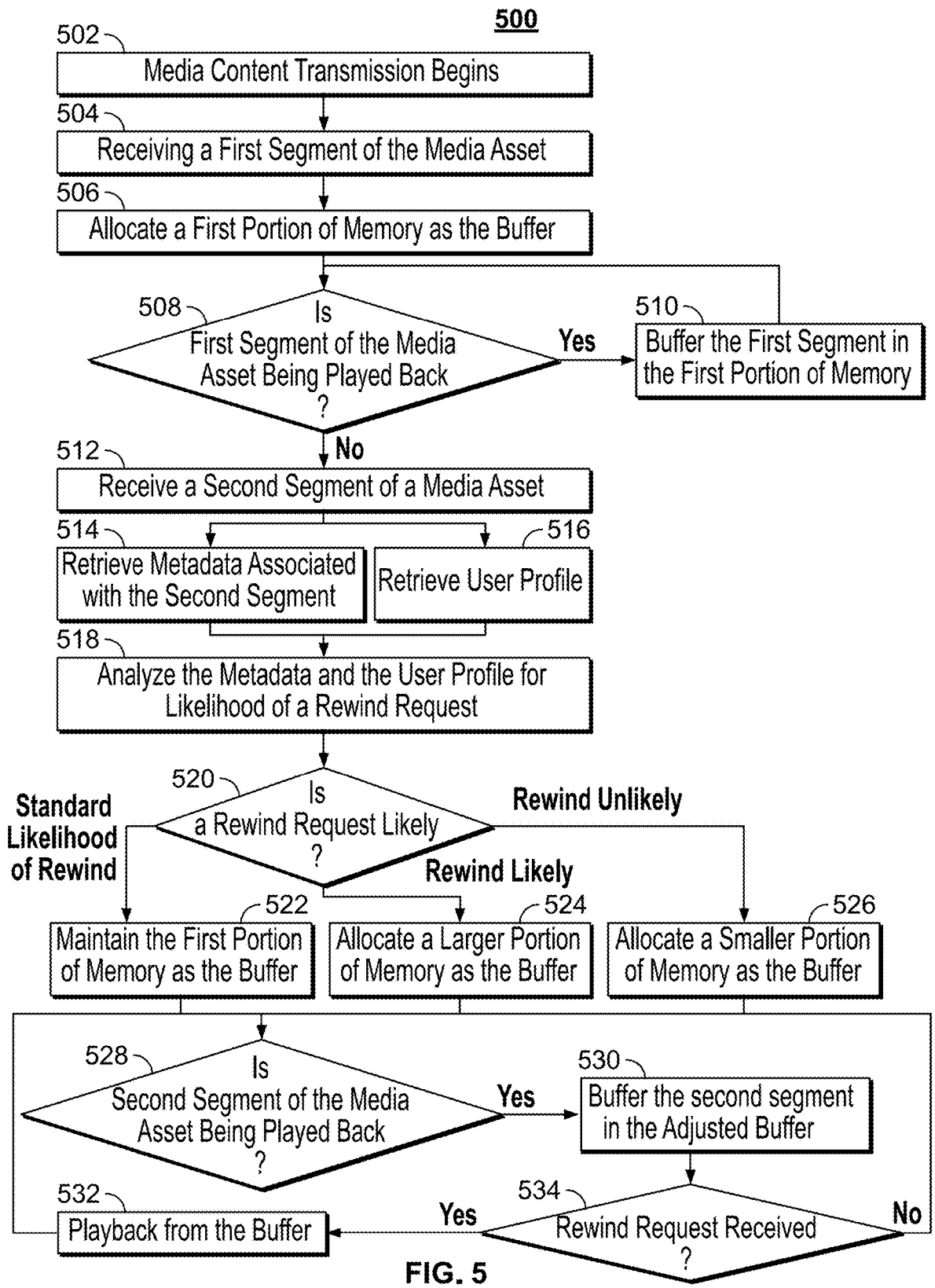
FIG. 5 is a flowchart of an illustrative process for choosing a size of a buffer based on a likelihood of receiving a rewind request, in accordance with some embodiments of the disclosure.

FIG. 5 is an illustrative process for choosing a size of a buffer based on a probability of receiving a rewind request. Process 500 begins at 502 when media content transmission begins. For example, control circuitry 204 may request a stream of the media asset from content source 316 or control circuitry 204 may tune to a transmission of the media asset (e.g., on a VOD channel) using any of the methods discussed above with respect to FIG. 3.

At 504, control circuitry 204 receives a first segment of the media asset. For example, control circuitry 204 may receive the first scene of "Titanic" (e.g., first segment 104) in a stream of the media asset from content source 316 via communications network 314. In another example, control circuitry 204 may receive the first segment from a tuner associated with control circuitry 204. At 506 control circuitry 204 allocates a first portion of memory as the buffer (e.g., default buffer 216) as discussed above with respect to FIG. 4.

At 508 control circuitry 204 determines whether the first segment of the media content is being played back, and if so, process 500 proceeds to 510 where control circuitry 204 buffers the first segment in the first portion of memory (e.g., default buffer 216). Otherwise, process 500 proceeds to 512 where control circuitry 204 receives a second segment of the media asset. For example, control circuitry 204 may determine what segment of the media asset is being played, and accordingly whether a segment of the media asset has completed playing, based on metadata associated with the media asset received by control circuitry 204. For example, control circuitry 204 may determine that first segment 104 is being played back when control circuitry 204 receives metadata from guidance data source 318 identifying a currently playing segment as a first chapter of "Titanic."

At 512 control circuitry 204 receives a second segment of the media asset (e.g., second segment 106). Control circuitry 204 may receive the second segment of the media asset using a comparable method as discussed above with respect to 504 of process 500. At 514 control circuitry 204 retrieves metadata associated with the second segment, such as data indicating that the segment contains romantic content (discussed in relation to 404 of process 400). At 516 control circuitry 204 retrieves a user profile. For example, control circuitry 204 may identify a user logged into the media application running on control circuitry 204. Control circuitry 204 may utilize the identity of the user to retrieve various data from the profile of the user, such as content preferences, the user's propensity to rewind media, a typical duration that the user rewinds media, etc. Based on the retrieved data from the profile and the metadata associated with the segment, control circuitry 204 analyzes the metadata and the user profile to determine a likelihood of receiving a rewind request during the segment (discussed further below in relation to FIG. 7).

At 520 control circuitry 204 determines whether the likelihood of receiving a rewind request is likely, unlikely, or neither likely nor unlikely. For example, control circuitry 204 may compute the likelihood as a value between 0 and 1, where 1 indicates that a rewind will be received with absolute certainty and 0 indicates that a rewind request will certainly not be received. In some embodiments, control circuitry 204 retrieves predefined ranges of values or conditions delimiting a likely, unlikely, and neither likely nor unlikely chances of receiving a rewind request. For example, control circuitry 204 may determine that receiving a rewind request is likely when the likelihood is between 0.75 and 1, neither likely nor unlikely when the likelihood is between 0.25 and 0.75, and unlikely when the likelihood is between 0 and 0.25. When control circuitry 204 determines that there is a standard likelihood of receiving a rewind request (e.g., a likelihood of 0.55), process 500 proceeds to 522 where control circuitry 204 maintains the first portion of memory as the buffer (e.g., the buffer is not resized from first buffer size 108/default buffer 216). When control circuitry 204 determines that receiving a rewind request is likely (e.g., a likelihood of 0.9), process 500 proceeds to 524 where control circuitry 204 allocates a larger portion of memory as the buffer (e.g., expanded buffer 218). When control circuitry 204 determines that receiving a rewind request is unlikely (e.g., a likelihood of 0.1), process 500 proceeds to 526 where control circuitry 204 allocates a smaller portion of the memory as the buffer (e.g., a portion of memory smaller than default buffer 216).

Upon allocating a portion of storage 208 as the buffer at 522, 524, or 526, control circuitry 204 monitors play progress of the second segment at 528 (e.g., based on metadata associated with a currently playing segment) and continues to buffers the second segment in the allocated buffer space at 530 while the second segment is playing. In some embodiments, control circuitry 204 maintains the buffer (e.g., default buffer 216 and/or expanded buffer 218) as a circular buffer and continually add newly played portions of the second segment to the buffer while overwriting an oldest data stored in the buffer.

At 534 control circuitry 204 determines whether a rewind request was received. For example, control circuitry 204 may detect a user input via user input interface 210 and may determine, based on the user input, whether the user input is a request to rewind the media asset. For example, control circuitry 204 may poll a memory location associated user input interface 210 to determine whether a user input was received between the polling interval. In another example, execution of the video application on control circuitry 204 may be interrupted when user input is received via user input interface 210. In both examples, control circuitry 204 retrieves data identifying the user input whenever input is received via user input interface 210. Control circuitry 204 determines whether the user input is a rewind request and, when the user input is a rewind request, determines a duration for the rewind request (e.g., by continually rewinding the media asset until control circuitry 204 no longer detects a rewind input at user input interface 210). In some embodiments, control circuitry 204 detects user input via I/O path 202 (e.g., as a user input identified in a packet received via a network). If control circuitry 204 determines that a rewind request is received, process 500 proceeds to 532 where control circuitry 204 plays back the second segment from the buffer. If control circuitry 204 does not detect a rewind request, process 500 returns to 528 where control circuitry 204 determines whether the second segment of the media asset is being played back.

Figure 6:
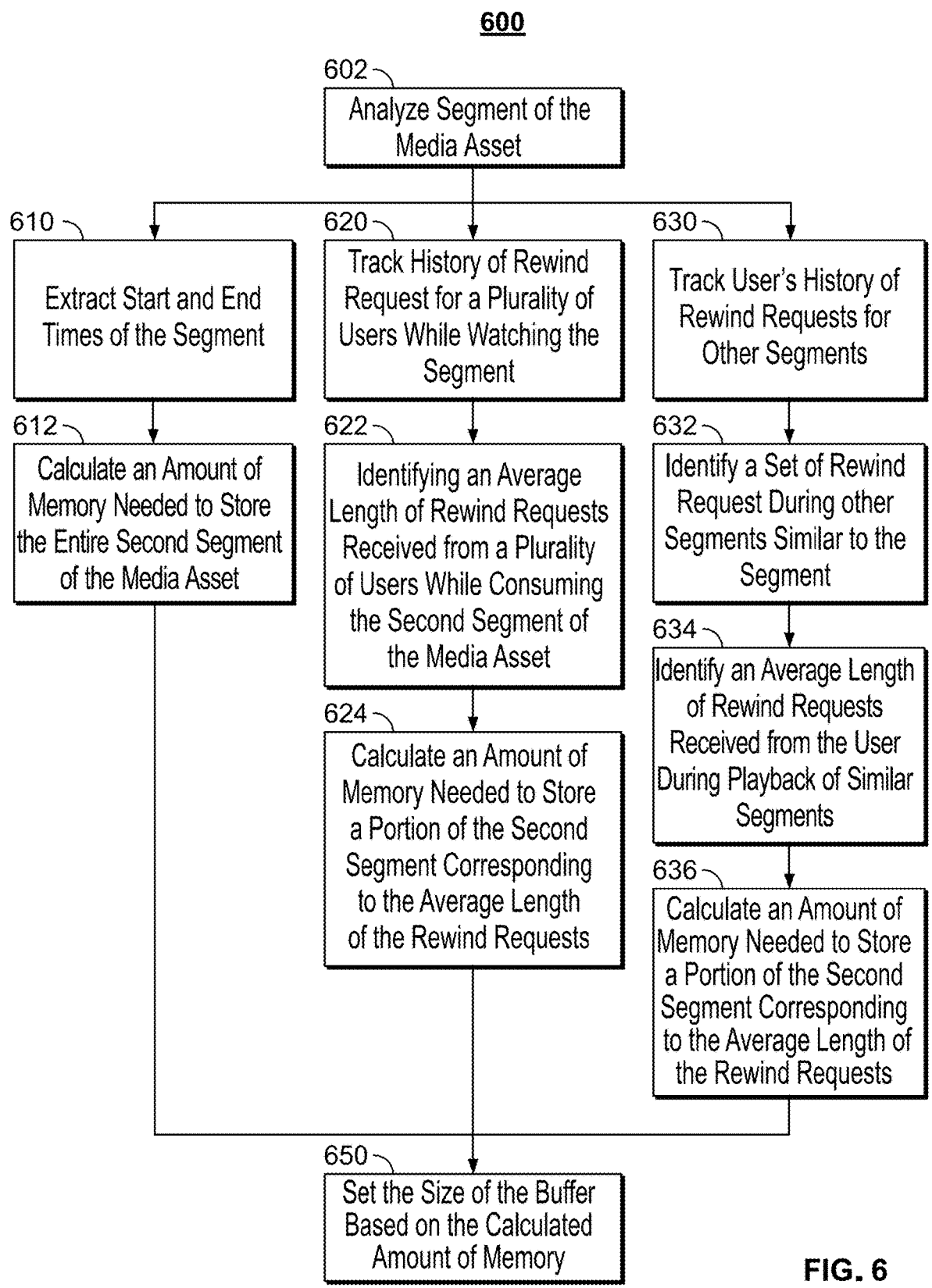
FIG. 6 is a flowchart of an illustrative process for calculating a size of a buffer to store a segment of a media asset, in accordance with some embodiments of the disclosure.

FIG. 6 is an illustrative process for computing a size for a rewind buffer, in accordance with some embodiments of the present disclosure. In some embodiments, control circuitry 204 computes the size of the buffer to accommodate an entirety of a segment (discussed further with respect to step 610 and 612). For example, control circuitry 204 may determine a size of the segment may allocate a portion of storage 208 equal to the size of the portion (e.g., so that a request to rewind any portion of the segment can be accommodated using only data from the buffer). In some embodiments, control circuitry 204 tracks an average amount of time that other users rewind the segment of the media asset and determines the size of the buffer based on the amount of time (discussed further with respect to steps 620, 622, and 624). For example, control circuitry 204 may determine that other users, such as users of the video application having similar preferences to the user, typically rewind two minutes of the segment to re-watch an important portion of the segment (e.g., an important romance scene in the segment). Accordingly, control circuitry 204 identifies a size for the buffer that large enough to store two minutes of the media asset (e.g., to accommodate a typical rewind request using only data from the buffer, based on the rewind requests of other users during the segment of the media asset). In some embodiments, control circuitry 204 identifies a size of the buffer based on a tracked rewind behavior of the user (discussed further with respect to steps 630, 632, 634, and 636). For example, control circuitry 204 may determine that when the user requests a rewind, the user typically rewinds for 45 seconds. Accordingly, control circuitry 204 identifies a size for the buffer that is large enough to store 45 seconds of the media asset (e.g., to accommodate a typical rewind request from the user using only data from the buffer).

Process 600 begins at 602 where control circuitry 204 analyzes a segment of the media asset to determine storage parameters required for the segment (e.g., an amount of storage required to store one second of the media asset). For example, control circuitry 204 may request metadata associated with a segment (as described above with respect to step 404 of process 400) to determine an amount of storage space required to store a segment of the media asset or control circuitry 204 may monitor a bitrate of a stream associated with the media asset to determine the storage parameters. For example, using the steps above control circuitry 204 may determine that seven megabits are required to store each second of the media asset.

In some embodiments, control circuitry 204 computes the size of the buffer to store an entirety of the segment of the media asset. At 610 control circuitry 204 extracts start and end times from the segment. Control circuitry 204 determines the start and end times based on the metadata associated with the segment. For example, control circuitry 204 may determine that the segment is a third chapter in the media asset. Control circuitry 204 may query media guidance data source 318 for a duration of the chapter and may receive the duration in response to the query. For example, control circuitry 204 may determine that the duration of the segment is five minutes. At 612 control circuitry 204 calculates an amount of memory needed to store the entire second segment of the media asset. Control circuitry 204 utilizes the storage parameters determined in step 602 to compute an amount of storage required to store the entire segment of the media asset (e.g., 7 Mbps). Control circuitry 204 multiplies the duration of the segment (e.g., five minutes, alternatively 300 seconds) with the amount of data associated with each second of the media asset (e.g., 7 Mbps) and may determine that 265.5 MB of storage is required to store the entirety of the segment.

In some embodiments, control circuitry 204 computes the size of the buffer based on typical rewind requests received during the segment for other users. At 620 control circuitry 204 tracks a history of rewind requests for a plurality of users while watching the segment. Control circuitry 204 logs a position and a duration of each rewind request received during the segment and may update a database (e.g., a database stored at guidance data source 318) with an indication of the position and duration of the rewind request. For example, when control circuitry 204 determines that a first user rewound the segment for two minutes, a second user rewound the segment for two and a half minutes, and a third user rewound the segment for one and a half minutes, control circuitry 204 transmits an identifier of the segment to the database along with each of the durations (e.g., two, two and a half, and one and a half minutes). At 622 control circuitry 204 determines an average length of the rewind requests received from the plurality of users. In some embodiments, control circuitry 204 receives each of the logged rewind requests and computes an average duration of the rewind request for the segment (e.g., by summing an amount of time associated with each rewind request for the segment and dividing by the amount of requests). In some embodiments, an average duration of the rewind requests is maintained by the database (e.g., guidance data source 318 updates the average based on each newly logged rewind request) and control circuitry 204 retrieves the average duration of the rewind requests by transmitting a query to the database uniquely identifying the segment of the media asset and requesting the average duration maintained by the database. At 624 control circuitry 204 calculates an amount of memory needed to store a portion of the segment corresponding corresponding to the average length of the rewind requests. For example, control circuitry 204 may utilize the bitrate computed at step 602 (e.g., 7 Mbps) and may multiply the bitrate by the average duration of the rewind requests (e.g., two minutes) to compute a size for the buffer (e.g., 105 MB).

In some embodiments, control circuitry 204 tracks a history of the user's rewind requests and sizes the buffer based on an average duration of the user's rewind requests. At 630 control circuitry 204 tracks a duration of the user's rewind request. In some embodiments, control circuitry 204 logs each rewind request by the user in a database. For example, control circuitry 204 may detect that the user requested to rewind a first media asset for 30 seconds, a second media asset for 60 seconds, and a third media asset for 45 seconds. Control circuitry 204 may store a duration of each rewind request (e.g., 30, 60, and 45 seconds) in a profile of the user. In some embodiments, control circuitry 204 maintains an average duration of the rewind requests from the user. For example, control circuitry 204 may initialize an average rewind request duration in the user profile to 30 seconds upon receiving a 30 second rewind request, may update the average rewind request duration to 45 seconds upon detecting a 60 second rewind request, and may maintain an average rewind request duration of 45 seconds upon receiving a third rewind request for 45 seconds from the user. At 622 control circuitry 204 identifies an average length of rewind requests by the user. For example, control circuitry 204 may retrieve an average rewind rewind request length stored in the user profile (e.g., 45 seconds) or control circuitry 204 may compute an average rewind request by retrieving each of the logged rewind requests, summing their durations and dividing by the number of log entries. At 636 control circuitry 204 computes an amount of memory needed to storage a portion of the segment corresponding to the average length of the rewind requests by the user. For example, control circuitry 204 may multiply the bitrate identified in step 602 (e.g., 7 Mbps) with the average duration of the rewind requests for the user identified in step 634 (e.g., 45 seconds) to compute the size of the buffer (e.g., 40 MB).

At 650 control circuitry 204 sets the size of the buffer based on the amount of storage calculated at step 612, 624, or 636. For example, control circuitry 204 may allocate 266 MB of storage 208 to accommodate all five minutes of the segment (as computed in step 612), 105 MB of storage 208 corresponding to the average two minute rewind request from a plurality of users consuming the segment (as computed in step 624), or 40 MB of storage corresponding to the average 45 second rewind request for the user (as computed in step 636).

FIG. 7 is an illustrative process for determining whether a rewind request will likely to be received during the segment. In some embodiments, control circuitry 204 determines whether a rewind request is likely based on a genre of the segment and a genre preference of the user. For example, if control circuitry 204 determines that a segment has romantic content and that the user prefers romantic content, control circuitry 204 determine that a rewind request is likely (e.g., because a user may wish to re-watch a segment having content that is preferred by the user). At 702 control circuitry 204 identifies a genre of the segment. For example, control circuitry 204 may determine that the segment comprises romantic content. In some embodiments, control circuitry 204 retrieves metadata associated with the segment indicating the genre of the segment as discussed above (e.g., metadata indicating that the segment comprises romantic content). In some embodiments, control circuitry 204 determines the genre by analyzing video or audio frames of the segment. For example, control circuitry 204 may analyze audio of second segment 106 and may determine, based on the audio, that the segment comprises romantic content (e.g., because control circuitry 204 may detect the phrase "I love you" in the audio and may determine that the phrase "I love you" is associated with romantic content). Based on the received genre and the genre preferences of the user control circuitry 204 determine a likelihood of receiving a rewind request.

At 706 control circuitry 204 determines whether the genres match. For example, control circuitry 204 may perform fuzzy matching between genre preferences of the user and the genre of the content to determine whether the genres match. If control circuitry 204 identifies an exact match (e.g., when the genre of the content is the same as a genre preference of the user), control circuitry 204 may determine that receiving a rewind request is likely. If control circuitry 204 determines the genres partially match, control circuitry 204 may compute a degree to which the genres partially match and may determine whether receiving a rewind request is likely based on comparing the degree to a threshold value. For example, control circuitry 204 may determine that the drama genre may matches a romance genre 70% (e.g., by comparing a similarity between content in the two genres and determining that about 70% of the content is similar) and that a horror genre matches a romance genre 1% (e.g., by performing a similar content comparison and determining that 1% of the content is similar). When value exceeds a predefined value, control circuitry 204 determines that a rewind request is likely. For example, control circuitry 204 may determine that when the genres match by at least 60% that a rewind request is likely. Therefore, when the profile of the user indicates a preference for drama, control circuitry 204 will determine that a rewind request is likely (e.g., because 70% exceeds 60%), but when the profile of the user indicates a preference for horror, control circuitry 204 will determine that a rewind request is not likely (e.g., because 1% does not exceed 60%).

In some embodiments, control circuitry 204 determines whether a rewind request is likely based on a language spoken in the segment. For example, control circuitry 204 may determine that a rewind request is likely when a language spoken in the segment does not match a language preferred by the user (e.g., because it may be difficult for the user to understand and may require the user to watch the segment again to fully comprehend the segment). For example, control circuitry 204 may determine a language of the segment based on a language identified in the metadata for the segment. In some embodiments, control circuitry 204 identifies the language of the media asset by analyzing the audio of the media asset or closed caption information associated with the segment and applying a language identification algorithm to the audio or transcription of the audio. In some embodiments, control circuitry 204 determines that the language spoken in the segment differs from that of the user when an artist in the media asset has an accent that differs from an accent of the user. For example, control circuitry 204 may determine that an actor in a movie with a strong regional accent, with respect to a regional accent of the user, may be difficult for the user to understand and may accordingly cause the user to replay the segment. At 714 control circuitry 204 accesses a preferred language of the user. For example, control circuitry 204 may retrieve, from the profile of the user, a default language of the voice application for the user, or control circuitry 204 may retrieve a regional setting associated with the user and may infer the preferred language based on the regional setting (e.g., control circuitry 204 may infer a preferred language of Italian for a user located in Italy). At 716 control circuitry 204 determines whether the languages match and determines that a rewind request is likely when the languages do not match. For example, if an actor/actress in the media asset is from a country that differs from that of the user, control circuitry 204 may determine that the user will likely request a rewind.

In some embodiments, control circuitry 204 determines whether a rewind request is likely based on an audio level of the segment. For example, control circuitry 204 may determine that a rewind request is likely when an audio level is below a predefined level (e.g., because the audio may be difficult for the user to hear and may likely prompt the user to request to rewind the segment). At 722 control circuitry 204 detects an audio level for the segment. For example, control circuitry 204 analyzes an audio waveform of the segment of the media asset and determines whether an average audio level for the segment exceeds a predefined value. In some embodiments, control circuitry 204 may identify the predefined value based on an average audio level for all audio in the media asset. Control circuitry 204 determines an average audio level for the entirety of the media asset based on sampling the audio levels across different segments of the media asset and averaging the audio level. Control circuitry 204 determines that the the audio level of the segment is low when the audio level associated with the segment is lower than an average audio level associated with the media asset and control circuitry 204 determines that the audio level of the segment is high when the audio level associated the segment is higher than an average audio level associated with the media asset.

At 724 control circuitry 204 determines whether the user tends to rewind due to low sound. For example, control circuitry 204 analyzes the log of rewind requests from the user (discussed above) and determines whether the rewind requests correspond to segments of the media asset that having a low audio level. If control circuitry 204 determines that the user tends to rewind during segments having low audio (e.g., the user requested a rewind during at least a threshold number of segments having low audio), control circuitry 204 determines that a rewind is likely during the segment having low audio.

In some embodiments, control circuitry 204 determines whether a rewind request is likely based on a complexity of the segment. For example, control circuitry 204 may determine that a rewind request is likely when a segment is complex for a user, and therefore likely to be misunderstood by a user watching a segment for a first time. At 732 control circuitry 204 identifies a complexity score of a segment. For example, control circuitry 204 may retrieve metadata associated with the segment identifying a complexity score for the segment (e.g., a value between 0 and 1 where 0 indicates that the segment is complex and 1 indicates that the segment is not complex. For example, control circuitry 204 may retrieve a complexity score of the segment of 0.7 based on the retrieved metadata.

At 734 control circuitry 204 identifies a user's complexity tolerance. In some embodiments, control circuitry 204 determines, a complexity tolerance of the user based on determining an average complexity of media assets and/or segments of media assets viewed by the user. For example, control circuitry 204 may retrieve a complexity score for each media asset of a plurality of media assets viewed by the user and may compute an average complexity score based on the retrieved complexity scores. In some embodiments, control circuitry 204 determines the user's complexity tolerance based on a complexity of segments where the user requested a rewind. For example, control circuitry 204 may retrieve a complexity associated with each segment identified in the log of rewind requests (discussed above). Control circuitry 204 may average the complexity associated with each segment and may determine the user's complexity tolerance based on the average. If the user typically rewinds segments having a complexity of 0.6 control circuitry 204 may determine that the user's complexity tolerance is 0.6. When a complexity of a segment exceeds the computed complexity tolerance of the user, control circuitry 204 determines that a rewind request is likely. At 736 control circuitry 204 compares the complexity score of the segment (e.g., 0.7) to the complexity tolerance of the user (e.g., 0.6) and determines that a rewind is likely because the exemplary complexity score is greater than the computed complexity tolerance.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods. For example, processes 400, 500, 600, and 700 can be performed on any of the the devices shown in FIGS. 1-3. Additionally any of the steps in processes 400, 500, 600, and 700 can be performed in any order, can be omitted, and/or can be combined with any of the steps from any other process.

While some portions of this disclosure may make reference to "convention," any such reference is merely for the purpose of providing context to the invention(s) of the instant disclosure, and does not form any admission as to what constitutes the state of the art.

What is claimed is:

1. A method for dynamically adjusting a size of a buffer of a media consumption device, the method comprising:
   buffering a first segment of a media asset in a buffer having a first buffer size;
   retrieving metadata associated with a second segment of the media asset;
   determining, based on retrieved metadata of the second segment of the media asset and a user profile, whether a rewind request is likely to be received during the second segment of the media asset by:
     identifying a complexity score of the second segment;
     retrieving a complexity tolerance score from the user profile; and
     in response to determining that complexity score of the second segment exceeds the complexity tolerance score, determining that the rewind request is likely to be received;
   in response to determining that the rewind request is likely to be received:
     increasing the size of the buffer to a second buffer size; and
     buffering the second segment of the media asset in the buffer having the second buffer size; and
   in response to detecting an end of the second segment, reducing the size of the buffer to the first buffer size.

2. The method of claim 1, further comprising:
   in response to determining that the rewind request is not likely to be received:
     decreasing the size of the buffer to a third buffer size; and
     buffering the second segment of the media asset in the buffer having the third buffer size; and
   in response to detecting the end of the second segment, increasing the size of the buffer to the first buffer size.

3. The method of claim 1, further comprising:
   receiving a rewind request during the second segment of the media asset; and
   in response to receiving the rewind request:
     rewinding the second segment; and
     playing content of the buffer on the media consumption device from a point to which the second segment was rewound.

4. The method of claim 1, wherein increasing the size of the buffer comprises:
   calculating an amount of memory needed to store the entire second segment of the media asset; and
   setting the size of the buffer based on the calculated amount of memory.

5. The method of claim 1, wherein increasing the size of the buffer comprises:
   identifying an average length of rewind requests received from a plurality of users while consuming the second segment of the media asset;
   calculating an amount of memory needed to store a portion of the second segment corresponding to the average length of the rewind requests; and
   setting the size of the buffer based on the calculated amount of memory.

6. The method of claim 1, wherein increasing the size of the buffer comprises:
   identifying an average length of rewind requests received from the user while consuming media segments that are similar to the second segment of the media asset;
   calculating an amount of memory needed to store a portion of the second segment corresponding to the average length of the rewind requests; and
   setting the size of the buffer based on the calculated amount of memory.

7. The method of claim 1, wherein increasing the size of the buffer comprises:
   determining a duration of the second segment;
   determining a bitrate for the media asset;
   calculating an amount of memory needed to store the second segment by multiplying the bitrate for the media asset by the duration; and
   setting the size of the buffer based on the calculated amount of memory.

8. The method of claim 7, wherein setting the size of the buffer based on the calculated amount of memory, comprises:
   determining a maximum buffer size for the media consumption device;
   in response to determining that the calculated amount of memory is greater than the maximum buffer size, setting the size of the buffer to the maximum buffer size; and
   in response to determining that the calculated amount of memory is not greater than the maximum buffer size, setting the size of the buffer to the calculated amount of memory.

9. A system for dynamically adjusting a size of a buffer of a media consumption device, the system comprising control circuitry configured to:
   buffer a first segment of a media asset in a buffer having a first buffer size;
   retrieve metadata associated with a second segment of the media asset;
   determine, based on retrieved metadata of the second segment of the media asset and a user profile, whether a rewind request is likely to be received during the second segment of the media asset by:

identifying a complexity score of the second segment;
retrieving a complexity tolerance score from the user profile; and
in response to determining that complexity score of the second segment exceeds the complexity tolerance score, determining that the rewind request is likely to be received;
in response to determining that the rewind request is likely to be received:
increase the size of the buffer to a second buffer size; and
buffer the second segment of the media asset in the buffer having the second buffer size; and
in response to detecting end of the second segment, reduce the size of the buffer to the first buffer size.

10. The system of claim 9, wherein the control circuitry, in response to determining that the rewind request is not likely to be received, is further configured to:
decrease the size of the buffer to a third buffer size; and
buffer the second segment of the media asset in the buffer having the third buffer size; and
in response to detecting the end of the second segment, increase the size of the buffer to the first buffer size.

11. The system of claim 9, wherein the control circuitry is further configured to:
receiving a rewind request during the second segment of the media asset; and
in response to receiving the rewind request:
rewinding the second segment; and
playing content of the buffer on the media consumption device from a point to which the second segment was rewound.

12. The system of claim 9, wherein the control circuitry is further configured, when increasing the size of the buffer, to:
calculating an amount of memory needed to store the entire second segment of the media asset; and
setting the size of the buffer based on the calculated amount of memory.

13. The system of claim 9, wherein the control circuitry is further configured, when increasing the size of the buffer, to:
identifying an average length of rewind requests received from a plurality of users while consuming the second segment of the media asset;
calculating an amount of memory needed to store a portion of the second segment corresponding to the average length of the rewind requests; and
setting the size of the buffer based on the calculated amount of memory.

14. The system of claim 9, wherein the control circuitry is further configured, when increasing the size of the buffer, to:
identifying an average length of rewind requests received from the user while consuming media segments that are similar to the second segment of the media asset;
calculating an amount of memory needed to store a portion of the second segment corresponding to the average length of the rewind requests; and
setting the size of the buffer based on the calculated amount of memory.

15. The system of claim 9, wherein the control circuitry is further configured, when increasing the size of the buffer, to:
determine a duration of the second segment;
determine a bitrate for the media asset;
calculate an amount of memory needed to store the second segment by multiplying the bitrate for the media asset by the duration; and
setting the size of the buffer based on the calculated amount of memory.

16. The system of claim 9, wherein the control circuitry is further configured, when setting the size of the buffer based on the calculated amount of memory, to:
determine a maximum buffer size for the media consumption device;
in response to determining that the calculated amount of memory is greater than the maximum buffer size, setting the size of the buffer to the maximum buffer size; and
in response to determining that the calculated amount of memory is not greater than the maximum buffer size, setting the size of the buffer to the calculated amount of memory.

* * * * *